US005899400A

United States Patent [19]

Yamada et al.

[11] Patent Number: 5,899,400

[45] Date of Patent: May 4, 1999

[54] MAGNETIC TAPE CASSETTE WITH DURABLE REEL-LOCKING MEMBER FORMED WITH RESILIENT EXTENSIONS

[75] Inventors: Takuji Yamada; Yukiyoshi Ishii, both of Kanagawa, Japan

[73] Assignee: Fuji Photo Film Co., Ltd., Kanagawa, Japan

[21] Appl. No.: 08/958,022

[22] Filed: Oct. 27, 1997

Related U.S. Application Data

[63] Continuation of application No. 08/621,122, Mar. 22, 1996, Pat. No. 5,730,381.

[30] Foreign Application Priority Data

Mar. 23, 1995 [JP] Japan .................................... 7-88594

[51] Int. Cl.[6] .................................... G03B 23/02

[52] U.S. Cl. .................... 242/343.2; 242/343; 242/338.1

[58] Field of Search ................................ 242/343, 338.3, 242/343.2, 338.1; 360/132

[56] References Cited

U.S. PATENT DOCUMENTS

| | | | |
|---|---|---|---|
| 4,579,295 | 4/1986 | Harada | 242/338.3 |
| 4,623,105 | 11/1986 | Pertzsch et al. | 242/338.3 |
| 4,739,949 | 4/1988 | Lin | 242/338.3 |
| 4,742,415 | 5/1988 | Oishi | 242/338.3 |
| 5,056,735 | 10/1991 | Gelardi et al. | 242/338.1 |
| 5,276,580 | 1/1994 | Tanaka et al. | 242/338.3 |
| 5,348,244 | 9/1994 | Nakagawa | 242/338.3 |
| 5,449,124 | 9/1995 | Fujii | 242/338.3 |

*Primary Examiner*—Daniel P. Stodola
*Assistant Examiner*—Gregory J. Strimbu
*Attorney, Agent, or Firm*—McAulay Nissen Goldberg Kiel & Hand, LLP

[57] ABSTRACT

A resilient, durable reel-locking member is provided in a magnetic tape cassette including a cassette case, a pair of reels rotatable in the cassette case to wind a magnetic tape, each of the reels including a flange and a plurality of teeth formed on a peripheral portion of the flange. The resilient, durable reel-locking member includes a slide body slidable between the reels in a front-rear direction of the cassette case, a pushing member pushing the slide body in the front-rear direction of the cassette case, a pair of cantilevered, arcuate expansions formed on opposite sides of the slide body, each of the expansions facing a respective adjacent one of the reels and extending in a direction normal to the front-rear direction of the cassette case, and a pair of claws, each of the claws projecting from a respective one of the expansions and being engagable with the teeth of the respective adjacent one of the reels. The magnetic tape cassette is having a reel-locking member with reduced susceptibility to engagement fatigue. Engagement fatigue is a frequent cause of failure and/or breakage of the reel-locking members of the conventional magnetic tape cassettes.

5 Claims, 4 Drawing Sheets

40 22 24 26 45 42 38 46 39 43 44 38 39 19 18 12 1a 13 11 1 1a 23

22
25
35
23
11
37
39
40
28
41
42
24
38
36
34

40
22
24
26
45
42
38
46
39
43
44
38
39
19
12
18
1a
1a
13
11
1
1a
23

MAGNETIC TAPE CASSETTE WITH DURABLE REEL-LOCKING MEMBER FORMED WITH RESILIENT EXTENSIONS

This is a continuation of application Ser. No. 08/621,122, filed Mar. 22, 1996, now U.S. Pat. No. 5,730,381.

BACKGROUND OF THE INVENTION

1. Field of the Invention

The present invention relates to a magnetic tape cassette suitable for use as a video tape cassette, and more particularly to a magnetic tape cassette having a reel-locking member with reduced susceptibility to engagement fatigue. Engagement fatigue is a frequent cause of failure and/or breakage of the reel-locking members of the conventional magnetic tape cassettes.

2. Description of the Related Art

FIG. 1 illustrates an inside structure of a conventional magnetic tape cassette. A video tape cassette 5 provides a cassette half 51 (an upper cassette half is removed for clarity, and hence only a lower cassette half is illustrated in FIG. 1) in which a pair of reels 52 and 53 are disposed for rotation. Around each of the reels 52 and 53 is wound a magnetic tape 54. The magnetic tape 54 is guided by tape guides 55 and 56 disposed in the vicinity of a front (an upper side in FIG. 1) and at opposite sides of the cassette 5 so that the magnetic tape 54 passes above an opening 57 formed in the vicinity of the front of the cassette half 51. Lower flanges 58, 59 of the reels 52, 53 are formed at a whole peripheral thereof with teeth 60, 61.

For instance, Unexamined Japanese Patent Publication No. 7-14342 has suggested a lock member 62 which is disposed in an almost triangular space 70 located in the vicinity of a rear of the cassette case and between the pair of the reels 52, 53 and which acts as a reel locking device for preventing the reels 52, 53 from rotating in order not to loosen the wound magnetic tape 54 in transportation and handling thereof while the video tape cassette is not loaded in a video deck (not shown).

The conventional lock member 62 is formed with almost triangular shaped ribs 80 and 81 between a rear plate 63 of the cassette half 51 and the pair of reels 52 and 53. The ribs 80 and 81 have straight portions extending in a front-rear direction of the cassette half and parallel to each other, and an engagement member 67 is slidably interposed between the straight portions 65 and 66. A compressed spring 68 disposed between the rear plate 63 and the engagement member 67 supplies the engagement member 67 with a pushing force towards the front of the cassette half. The engagement member 67 is formed at a bottom surface thereof with an opening 69 through which a lock-releasing pin of a video deck is to be inserted. The cassette half 51 is formed at a bottom surface thereof with an opening (not shown) located correspondingly to the opening 69 of the engagement member 67.

The engagement member 67 is suitably made of elastic resin, and has a rectangular-shaped slide body 71 having a relatively wide bottom surface area for stable slide movement, as illustrated in FIG. 2. The slide body 71 is integrally formed at a front face thereof with a pair of engagement claws 72 and 73 which are engagable to the teeth 60, 61 of the reels 52, 53.

The engagement claws 72 and 73 are designed to be relatively long and to have thin hinge portions 74, 75, respectively, at the proximal ends of the engagement claws 72 and 73, that is, at joint portions connecting the engagement claws 72, 73 to the slide body 71. Thus, the engagement claws 72 and 73 are able to elastically and transversely swing as shown with arrows A in FIG. 2. As illustrated in FIG. 2, a guide device such as pins 90 is disposed on the cassette half 51 in a projecting fashion. The pins 90 ensure that the engagement claws 72 and 73 open relative to each other to thereby engage to the teeth 60, 61 for locking the reels 52 and 53 as the slide body 71 slides towards the front of the cassette half, and that the engagement claws 72 and 73 close relative to each other or move towards each other to thereby move away from the teeth 60, 61 for releasing the reels as the slide body 71 slides towards the rear of the cassette half.

In the conventional video tape cassette 5, the engagement claws 72 and 73 are designed to be elongated and to have the hinge portions 74 and 75 by forming the proximal ends of the engagement claws 72 and 73 to be thin so that the engagement claws 72 and 73 of the engagement member 67 of the lock member 62 are transversely swingable. Thus, the hinges 74 and 75 are often fatigued when the video tape cassette 5 falls on a floor or by long term use, for instance, so that the engagement claws 72 and 73 are broken at the hinge portions 74 and 75 or are deformed with the result of uncertain lock of the reels 52 and 53. In addition, when the engagement member 67 is handled as a unitary part prior to cassette assembling, the engagement claws 72 and 73 may be undesirably damaged. Thus, much attention is to be paid to the engagement claws 72 and 73.

On the other hand, there has been suggested a magnetic tape cassette in which the engagement claws are prepared separately from the slide body, and the engagement claws are secured to the cassette half for rotation. The slide movement of the slide body causes the engagement claws to rotate to thereby engage distal ends of the engagement claws to the teeth of the reels. For instance, refer to Unexamined Japanese Patent Publication No. 6-44733. However, this magnetic tape cassette has to have a greater number of parts since the engagement claws are formed separately from the slide body, and has much complexity in assembling thereof. In particular, each of parts has to be small in a small-sized magnetic tape cassette. Thus, if there are a great number of parts, assembling of the cassette takes too much time and labor. For this reason, the lock member which is to be assembled is not preferable. The above mentioned problem also arises in various types of magnetic tape cassettes as well as the video tape cassette 5.

SUMMARY OF THE INVENTION

The present invention has an object of overcoming problems in conventional circumstances by providing a magnetic tape cassette capable of ensuring certain lock of reels and being readily assembled.

The present invention provides a magnetic tape cassette which includes: a cassette case; a pair of reels rotatable in the cassette case to wind a magnetic tape, each of the reels including a flange and a plurality of teeth formed at a peripheral portion of the flange; and a reel locking device engaging the flange for preventing the reels from rotating, the reel locking device further includes a slide body slidable between the reels in a front-rear direction of the cassette case, a pushing member pushing the slide body in the front-rear direction of the cassette case, a pair of expansions formed on opposite sides of the slide body facing the reels, each of the expansions expanding in a direction normal to the front-rear direction of the cassette case, and a pair of claws projecting from the respective expansions and being engagable to the teeth.

In a preferred aspect, the expansion of the reel locking device is supported in at least two positions to the opposite sides of the slide body to form a hollow bridge-like structure.

In another preferred aspect, the slide body of the reel locking device is sized so that while the slide body slides in the front-rear direction of the cassette case, a slide surface of the slide body always closes an opening provided at the cassette case through which a lock releasing pin is to be inserted when lock is to be ceased, and the slide body of the reel locking device is designed to have a width so that when the claw moves the same distance in a front-rear direction of the cassette case as a distance of slide movement of the cassette case in a front-rear direction thereof, the claw can be engaged to the teeth without the slide body interfering with the pair of reels.

In still another preferred aspect, the bridge-like structure is a cantilever structure and has a curved surface expanding towards the reels.

In the magnetic tape cassette in accordance with the present invention, the slide body is always pushed towards the reels by the pushing force supplying device, and thus the engagement claws projecting from the expansion of the slide body are engaged to the teeth of the reels. Accordingly, it is possible to narrow the slide body, resulting in that the slide body can deeply enter a space formed between the reels to thereby make it possible to increase movement distance of the slide body in a front-rear direction of the cassette half. In addition, since the expansion transversely expands from the sides of the slide body, it is possible to increase a width of the slide body correspondingly to the width of the expansion, causing stable slide movement of the slide body. Furthermore, since the engagement claw extends from the expansion, it is possible to shorten the length of the engagement claw. Thus, the rigidity of the engagement claw can be maintained to be high, and in addition, the fatigue of the engagement claw can be prevented because there are no longer movable portions such as the hinge portions.

In addition, it is possible to form the expansion and the engagement claw integrally with the slide body. In a preferred embodiment in which the expansion has a hollow bridge-like structure, the bridge-like structure ensures elastic deformation of the engagement claw. Thus, even if there is a dispersion in slide movement distance of the slide body, elastic recovery of the bridge-like structure enables the engagement claw to surely engage to the teeth of the reels. In another preferred embodiment in which the bridge-like structure has a curved surface, it is possible to prevent the bending stress to be applied to the engagement claw from concentrating to a point, even if the bridge-like structure is elastically deformed. Therefore, the fatigue of and damage to the engagement claw can be prevented.

DESCRIPTION OF THE PREFERRED EMBODIMENTS

Hereinbelow will be described preferred embodiments in which the magnetic tape cassette in accordance with the present invention is applied to a video tape cassette, with reference to accompanying drawings.

Figure 3:
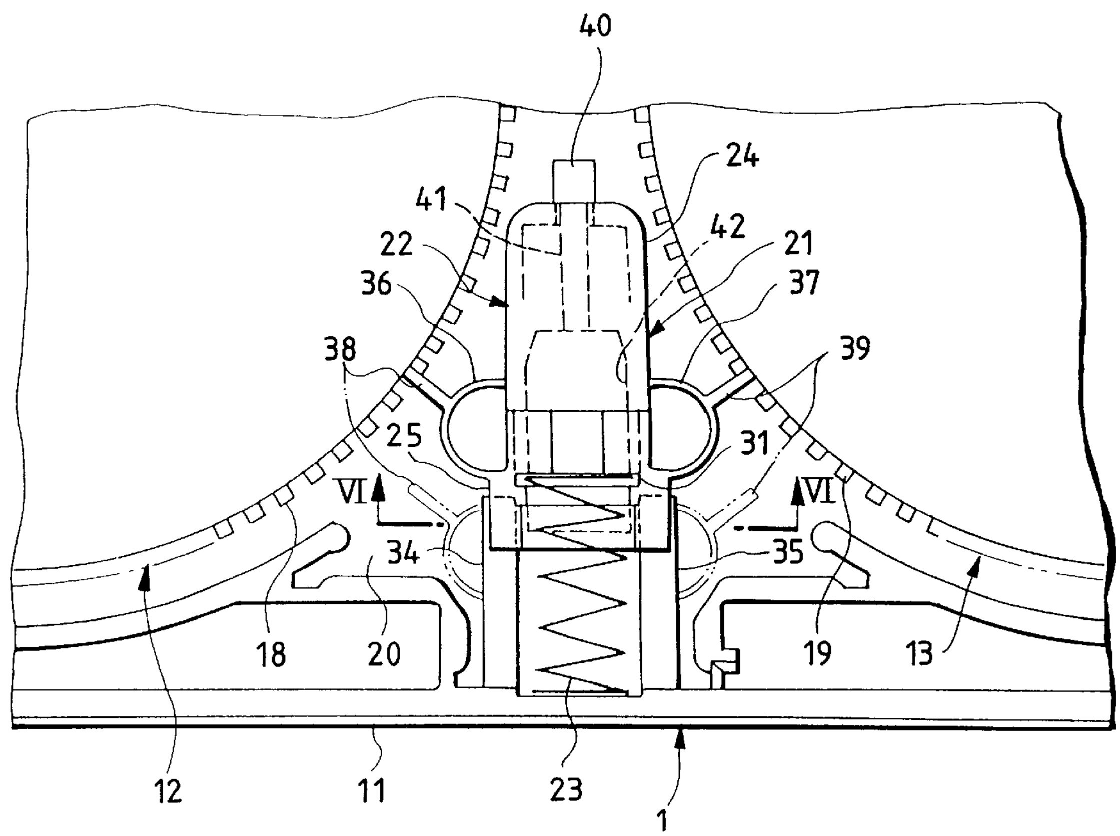
FIG. 3 is a partial, plan view illustrating a video tape cassette in accordance with the present invention.

As illustrated in FIG. 3, a video tape cassette 1 in accordance with the present invention provides a cassette half 11 (an upper cassette half is removed for clarity, and hence only a lower cassette half is illustrated in FIG. 3) in which a pair of reels 12 and 13 are disposed for rotation. Around each of the reels 12 and 13 is wound a magnetic tape (not shown). Lower flanges of the reels 12 and 13 are formed at a whole circumference thereof with teeth 18 and 19, respectively.

A lock member 21 acting as a reel locking device for preventing the reels 12 and 13 from rotating is disposed in an almost triangular space 20 formed between the pair of the reels 12 and 13 in order not to loosen the wound magnetic tape while the video tape cassette 1 is not being loaded in a video deck (not shown). The operation of parts other than the lock member 21 is the same as that of the conventional video tape cassette 5 explained with reference to FIG. 1, and hence is not explained.

Figure 4:
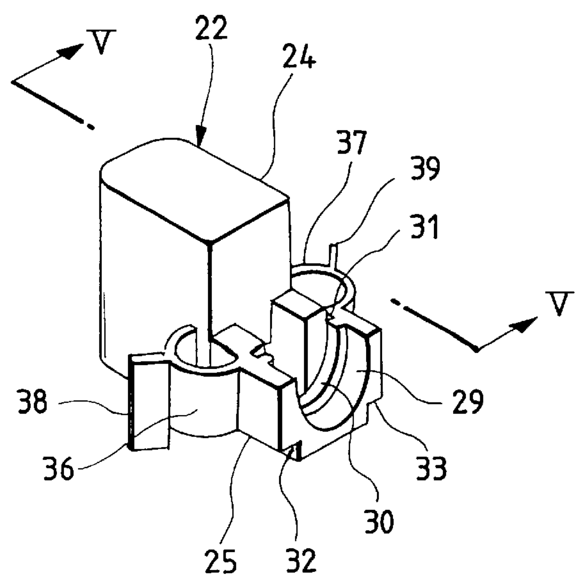
FIG. 4 is a perspective view illustrating the slide body of the locking member of the video tape cassette illustrated in FIG. 3.
Figure 5:
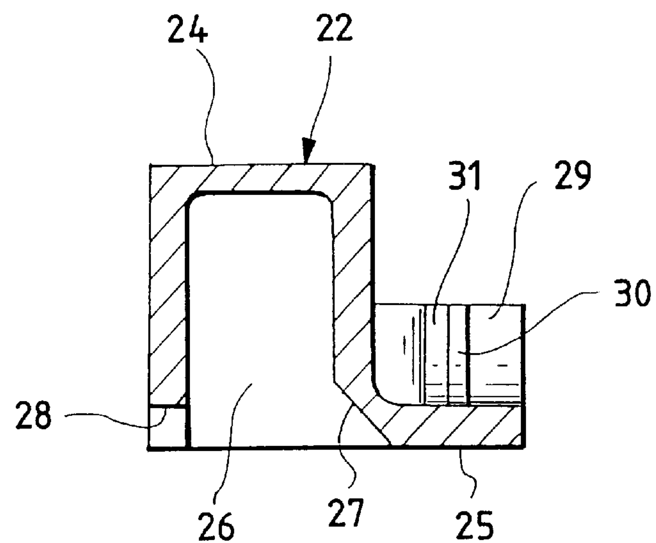
FIG. 5 is a cross sectional view taken along the line V—V in FIG. 4.

The lock member 21 provides a slide body 22 slidably disposed between the reels 12 and 13, and a compressed spring 23 for pushing the slide body 22 towards the reels 12 and 13. The slide body 22 provides a hollow portion 24 into which a releasing pin is to be inserted and which is relatively high, and a guide portion 25 at the rear of the hollow portion 24, as illustrated in FIG. 4. As illustrated in FIG. 5, the hollow portion 24 into which a releasing pin is to be inserted is in the form of a relatively deep dome, and is formed at a rear end of an opening 26 with an inclined surface 27. The hollow portion 24 is designed to have a sufficiently narrow outer width so that the portion 24 is able to sufficiently enter a space formed between the reels 12 and 13. In addition, the slide body 22 is sized so that, throughout its entire range of motion the slide body covers an opening formed in the bottom surface of a lower cassette half, through which a lock releasing pin may pass.

As will be explained later, when the video tape cassette 1 is loaded to a video deck, a lock releasing pin of the video deck pushes the inclined surface 27 to retreat the slide body 22, so that reels 12 and 13 are released. The hollow portion 24 into which a lock releasing pin is to be inserted is designed to have a length in a front-rear direction of the cassette half in such a way that a lock releasing pin does not abut an inner surface of a front wall of the opening 26 when the slide body 22 retreats by a certain distance, that is, until reels 12 and 13 are released. The front wall of the opening 26 is formed at the center thereof with a guide recess 28 having a certain width. As illustrated in FIG. 4, the guide portion 25 is formed a U-shaped recess 29 opening upwardly for containing a part of the compressed spring 23 therein. Wholly along an inner surface of the U-shaped recess 29 is formed a projecting rib 30. Adjacent to the projecting rib 30 is formed an engagement groove 31 into which an end of the compressed spring 23 is to be fixed.

Figure 6:
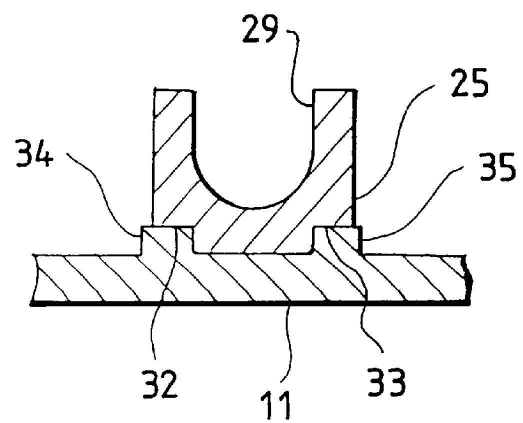
FIG. 6 is a cross sectional view taken along the line VI—VI in FIG. 3.

As illustrated in FIG. 6, the guide portion 25 is formed at a bottom surface thereof and at opposite sides with guide grooves 32 and 33. The guide grooves 32 and 33 are to be fit into guide rails 34 and 35 formed on the cassette half 11, respectively, so that the slide body 22 is regulated to slide linearly only in a front-rear direction of the cassette.

As illustrated in FIG. 3, the slide body 22 is formed at opposite sides thereof with semicircular, projecting bridges 36 and 37 from which engagement claws 38, 39 project at a foreside of the bridges 36 and 37 towards a central axis of corresponding reels. The bridges 36 and 37 are supported at two positions, and has a hollow structure which is open vertically. The bridges are designed to have suitable rigidity and elasticity by adjusting a thickness thereof. The engagement claws 38 and 39 are relatively thick, and extend at a suitable angle towards the reels in order to make it easy to enter between the adjacent teeth 18, 19 of the reels 12 and 13.

Figure 7:
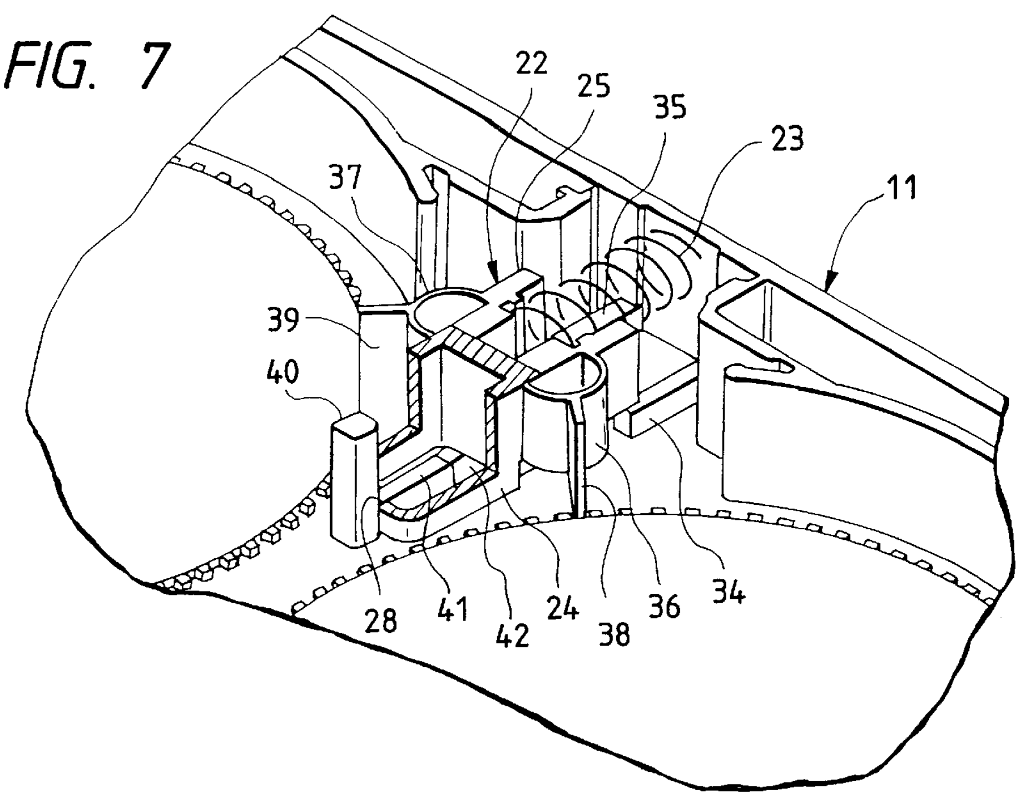
FIG. 7 is a perspective view showing how the lock member is loaded with a portion thereof broken away for clarity.

As illustrated in FIG. 7 which is a view with portions of the lock member being broken away, the cassette half 11 is formed with a stopper 40 in the form of a rectangular pillar in order to restrict a forward movement of the slide body 22. The engagement claws 38 and 39 are arranged to enter by a certain length between the adjacent teeth 18 and 19 of the reels 12 and 13 with the slide body 22 abutting the stopper 40, so that the reels 12 and 13 are surely locked. To the rear of the stopper 40 is formed a guide block 41 in connection with the stopper 40 and linearly extending in a front-rear direction of the cassette.

Onto the guide block 41 is fit the guide recess 28 formed in the hollow portion 24 of the slide body 22, causing a distal end of the hollow portion 24 to be guided with the result of stable linear movement of the hollow portion 24 in a front-rear direction of the cassette. In addition, the cassette half 11 is formed at the rear of the guide block 41 and correspondingly to a movement area of the hollow portion 24 with an opening 42 through which a lock releasing pin of a video deck is to be inserted.

Hereinbelow will be explained the operation of the lock member 21 with reference to FIG. 3.

Since a lock releasing pin of a video deck is not inserted into the hollow portion 22 of the slide body 24 when the video tape cassette 1 is being taken out of the video deck, the slide body 22 is pressed against to the stopper 40 by a pushing force exerted by the compressed spring 23. In this situation, the engagement claws 38 and 39 are inserted between the adjacent teeth 18 and 19 of the reels 12 and 13, so that the reels 12 and 13 are surely locked. Thus, the magnetic tape is prevented from being loosened, and it is possible to prevent the magnetic tape from getting twisted around a guide roller of the video deck when the video tape cassette 1 is loaded into the video deck.

When the video tape cassette 1 is loaded into the video deck, a lock releasing pin (not shown) of the video deck is inserted into the opening 26 of the hollow portion 24 through the opening 42 of the cassette half 11. Thus, the lock releasing pin of the video deck pushes the inclined surface 27 (see FIG. 5), causing the slide body 22 to move against the pushing force exerted by the compressed spring 23. The slide body 22 retreats by a certain distance, so that the engagement claws 38 and 39 are drawn out from the teeth 18, 19 of the reels 12 and 13, as shown with two-dot chain lines in FIG. 3. Thus, the reels 12 and 13 are released from the lock, and hence now rotatable.

Figure 1:
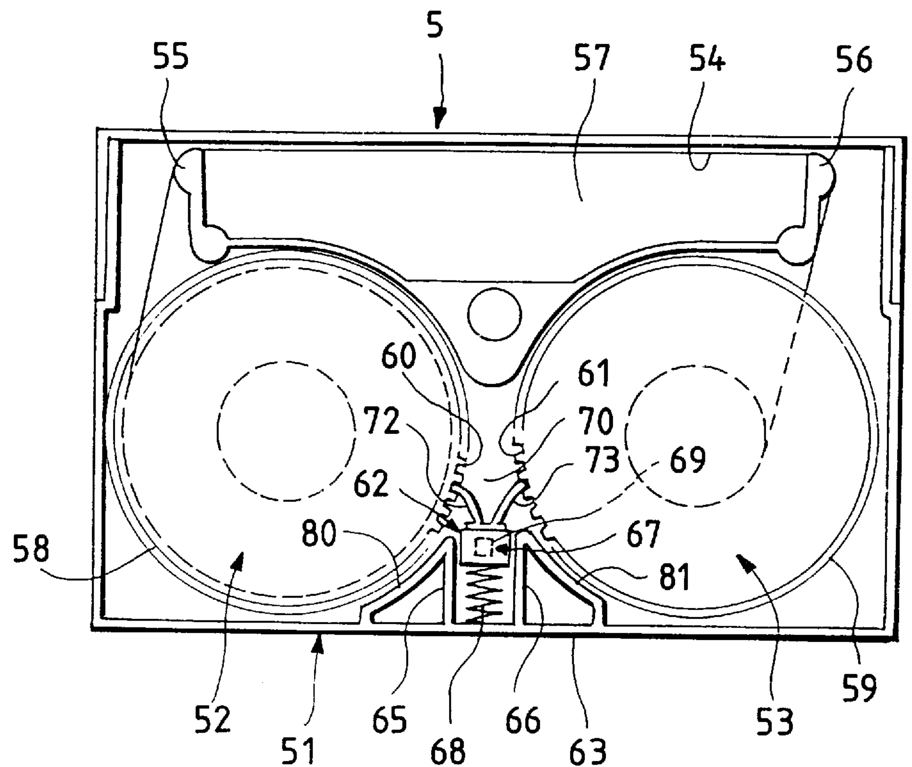
FIG. 1 is a plan view of a conventional video tape cassette.
Figure 2:
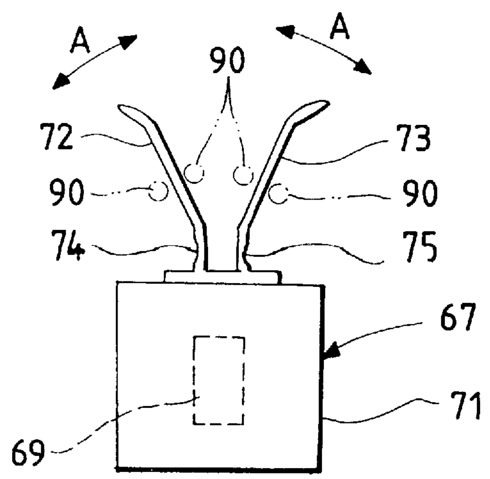
FIG. 2 is a plan view of a conventional lock member.

As mentioned earlier, since the video tape cassette 1 is formed at the opposite sides of the slide body 22 with the engagement claws 38 and 39 through the bridges 36 and 37, it is possible to shorten the length of the engagement claws 38 and 39 in comparison with the conventional video tape cassette having the engagement claws directly formed on the slide body as illustrated in FIGS. 1 and 2. In addition, the engagement claws 38 and 39 do not need to have a hinge portion to which bending stress tends to concentrate.

Accordingly, it is unlikely that the engagement claws 38 and 39 are fatigued like the conventional engagement claws, and hence a force for locking the reels can be surely obtained in a long term. In addition, even if the engagement claws 38 and 39 are made shorter, the engagement claws 38 and 39 are shiftable so that ends thereof direct towards a center of the reels, by forming the bridges 36 and 37 to be thin to thereby supply suitable elastic performance therewith. Therefore, such an arrangement of the engagement claws 38 and 39 can reduce an impact which would occur when the engagement claws engage to the teeth of the reels. Furthermore, as the slide body 22 slides forward, the engagement claws 38 and 39 can easily enter between the adjacent teeth 18 and 19 of the reels 12 and 13, respectively.

Furthermore, since the engagement claws 38 and 39 are secured to the slide body 22 through the bridges 36 and 37, respectively, it is possible to reduce a width of the slide body 22, which enables the slide body 22 to enter more deeply between the reels 12 and 13. Accordingly, even if the engagement claws 38 and 39 are short in length, it is possible to increase a movement distance thereof, so that the engagement claws 38 and 39 can surely enter between adjacent teeth 18 and 19 of the reels 12 and 13, respectively.

Since the bridges 36 and 37 have a curved outer surface and hence has an appropriate elasticity, even when the engagement claws 38 and 39 are compressed against the reels 12 and 13, a counterforce exerted on the engagement claws 38 and 39 by the reels 12 and 13 is absorbed into the bridges 36 and 37 due to the elasticity of the bridges, so that it is possible to prevent a stress from concentrating on proximal ends of the engagement claws 38 and 39. Thus, it is possible to prevent the breakage of the engagement claws 38 and 39. Since the slide body 22 provides the hollow portion 24 into which the releasing pin is to be inserted, the guide portion 25, the bridges 36 and 37, and the engagement claws 38 and 39 all of which are integrally formed, the slide body 22 can have a simple structure, and provide enhanced reliability. In addition, since the lock member 21 can be integrally formed, a manufacture cost can be reduced and it is more readily to incoporate the lock member into the cassette.

In the above mentioned embodiment, the bridges 36 and 37 are fixed at opposite ends thereof to the sides of the slide body 22. The magnetic tape cassette in accordance with the present invention can be embodied as illustrated in FIG. 8.

Figure 8:
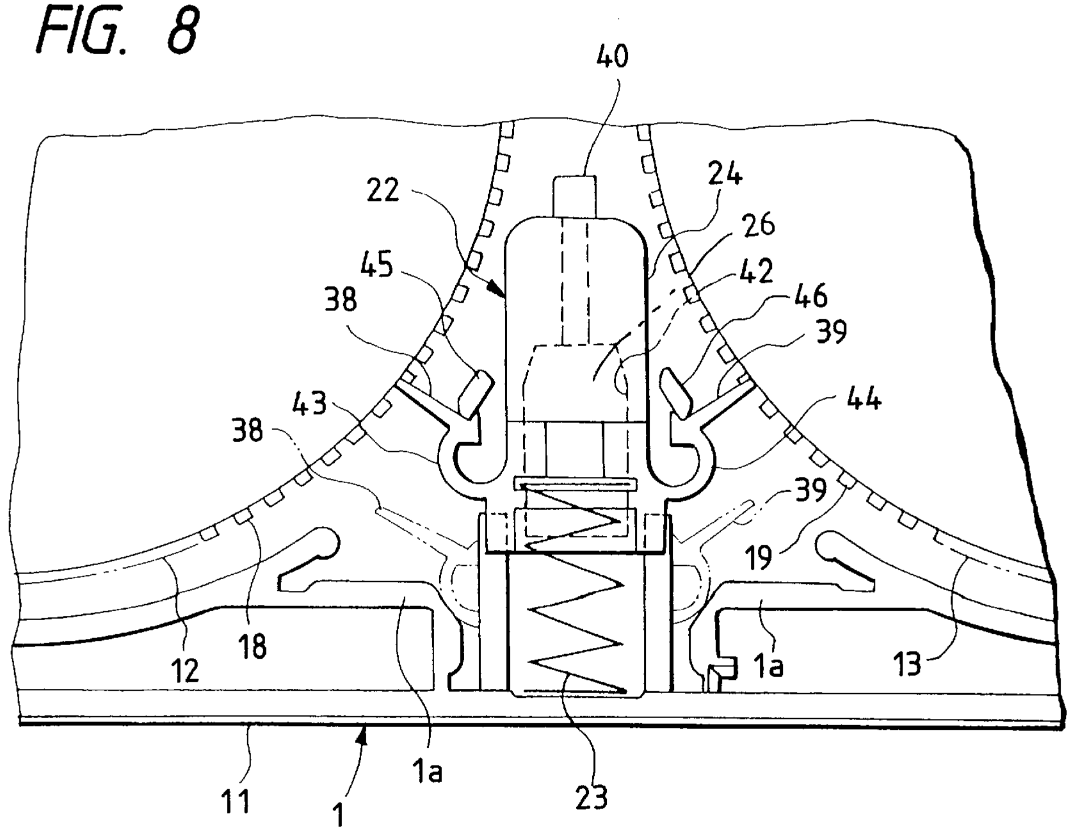
FIG. 8 is a plan view illustrating another embodiment in accordance with the present invention.

In this embodiment, as illustrated in FIG. 8, front ends of bridges 43 and 44 are separated from the slide body 22. Namely, the bridges 43 and 44 are cantilevered. The cantilever structure of the bridges increases elastic displacement of the bridges 43 and 44 and hence the displacement of the engagement claws 38 and 39, so that the engagement claws 38 and 39 can readily enter between the teeth 18 and 19 of the reels 12 and 13, respectively.

It is preferable to provide stoppers 45 and 46 for locating the distal ends of the bridges 43 and 44 in order to prevent abnormal deformation of the engagement claws 38 and 39, even if the slide body 22 forwards by more than an intended distance when the engagement claws 38 and 39 enter between the teeth 18 and 19 by a predetermined distance.

When the slide body retreats, the outer surface of the bridges 43 and 44 abut an inclined surface of a partition wall 1*a*, so that the bridges are wholly, externally compressed, and wholly deformed. Thus, the engagement claws 38 and 39 are made to move towards the inside of the slide body, as shown with two-dot chain lines in FIG. 8.

In the magnetic tape cassette in accordance with the invention, the shape of the expansion such as the bridges 36, 37, 43 and 44 are not to be limited to the above mentioned ones. For instance, the expansion can be formed as various shapes such as a hollow bridge like structure having a thin plate closing an upper opening and a solid semicircular pillar.

As having been described, the magnetic tape cassette in accordance with the invention provides a slide body disposed slidable between a pair of reels, a device for forcing the slide body towards the reels, expansions formed on opposite sides of the slide body in facing relation to the reels, and engagement claws each extending from the expansion and engagable to teeth formed on a whole periphery of the reels.

Thus, the magnetic tape cassette in accordance with the invention makes it possible to shorten the engagement claws relative to a conventional one having no expansions, and hence the rigidity against an impact which would occur when the cassette falls on a floor or no use in long term can be increased, and in addition, it is possible to prevent the fatigue of the engagement claws, so that the lock of the reels can be ensured in long term.

In addition, the expansion can be formed as a hollow bridge-like structure. Since the bridge-like structure can be elastically deformed, it is now possible to enter the engagement claws between the adjacent teeth of the reels. Furthermore, the slide body, the expansions and the engagement claws all of which can be integrally formed provides a simple structure. In particular, assembling performance and reliability can be enhanced for small-sized magnetic tape cassette.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A magnetic tape cassette comprising:

a cassette case having a guide rail member extending in a front-rear direction of the cassette case;

a pair of reels rotatable in the cassette case to wind a magnetic tape, each of the reels including a flange and a plurality of teeth formed on a peripheral portion of the flange; and reel-locking member for engaging the teeth of the flanges to prevent the reels from rotating in the cassette case, the reel-locking member comprising:

a slide body slidable between the reels in the front-rear direction, the slide body being guided by a guide groove portion provided on a bottom surface of the slide body for guiding the slide body between the reels in the front-rear direction, the guide groove portion being slidably engaged with the guide rail member;

a pushing member pushing the slide body in the front-rear direction;

a pair of extensions formed on opposite sides of the slide body, each of the extensions being an elastic, cantilevered, arcuate beam having a convex surface facing toward a respective adjacent one of the reels; and a pair of claws, each of the claws engageable with the teeth of a respective one of the flanges, each of the claws projecting from the convex surface of each of the extensions, respectively;

the slide body being slidable between a position in which the claws engage the teeth of the flanges to prevent rotation of the reels in the cassette case and a position in which the reels can freely rotate.

2. The magnetic tape cassette of claim 1 wherein each of the elastic, cantilevered, arcuate beams extends from a respective one of the opposite sides of the slide body in a direction normal to the front-rear direction.

3. The magnetic tape cassette of claim 1 further comprising a stopping member which prevents forward motion of the slide body once the claws engage the teeth.

4. The magnetic tape cassette of claim 1 further comprising a pair of stopping members, each of the stopping members preventing forward motion of a respective one of the elastic, cantilevered arcuate beams when the claw of said respective one of said elastic, cantilevered, arcuate beams engages the teeth of the respective one of the flanges.

5. The magnetic tape cassette of claim 1 wherein the cassette case includes inclined surfaces for abutting the pair of elastic, cantilevered, arcuate beams when the slide body is at the position in which the reels can freely rotate, said inclined surfaces causing the elastic, cantilevered, arcuate beams to deform from a shape the elastic, cantilevered, arcuate beams have when the slide body is in the position in which the claws engage the teeth.

* * * * *